United States Patent
Wang et al.

(10) Patent No.: US 6,571,156 B1
(45) Date of Patent: May 27, 2003

(54) SPACECRAFT POWER ACQUISITION PROCEDURE AND METHOD FOR WING-DEPLOYED CONFIGURATION

(75) Inventors: Grant Wang, Hacienda Heights, CA (US); Umesh Ketkar, Torrance, CA (US); Sadek W. Mansour, Redondo Beach, CA (US); Sheng N. Sun, Torrance, CA (US)

(73) Assignee: The Boeing Company, Seattle, WA (US)

( * ) Notice: Subject to any disclaimer, the term of this patent is extended or adjusted under 35 U.S.C. 154(b) by 27 days.

(21) Appl. No.: 10/114,826

(22) Filed: Apr. 1, 2002

(51) Int. Cl.$^7$ ................................................ B64G 1/36
(52) U.S. Cl. ........................................ 701/13; 244/171
(58) Field of Search ................... 701/13, 3, 4; 244/171, 244/164, 158 R, 173

(56) References Cited

U.S. PATENT DOCUMENTS 4,358,076 A * 11/1982 Lange et al. ................ 244/164
5,132,910 A * 7/1992 Scheit et al. ................ 244/171
5,255,879 A 10/1993 Yocum et al.

* cited by examiner

Primary Examiner—Richard M. Camby
(74) Attorney, Agent, or Firm—DiPinto & Shimokaji, P.C.

(57) ABSTRACT

A simple, robust algorithm for power acquisition for power, thermal, and momentum safety for high heater-power spacecraft uses current sensors rather than sun sensors and includes a wing sun search phase, an xz slew phase, and a safe hold phase. Solar wing current is continuously monitored against a high current threshold and a low current threshold. Wing sun search phase transitions either to xz slew phase or safe hold phase. When current is too low, the xz slew phase is entered and slews the spacecraft about an axis in the xz plane until current is high enough. When current is high enough, the algorithm transitions or remains in safe hold phase and the spacecraft is spun about its wing axis. A low current persistence timer is longer than a high current persistence timer in order to bias the algorithm to prefer safe hold phase over xz slew phase.

45 Claims, 4 Drawing Sheets

SPACECRAFT POWER ACQUISITION PROCEDURE AND METHOD FOR WING-DEPLOYED CONFIGURATION

BACKGROUND OF THE INVENTION

The present invention generally relates to power acquisition for spacecraft and, more particularly, to algorithms and methods of power acquisition for spacecraft in solar panel wing-deployed configuration.

Prior art spacecraft typically acquire the sun for power safety using sun sensor assemblies, for example, either wide field of view (WFOV) sun sensor or narrow field of view (NFOV) slit sun sensor. Prior art methods of sun, or power, acquisition using sun sensor assemblies often serve dual purposes of acquiring the sun to achieve an accurate spacecraft body-to-sun attitude knowledge and placing the solar wings normal, i.e., orthogonal, to the sun-line, i.e., a line from the spacecraft to the sun, to maximize solar power. A prior art method of power acquisition is disclosed in U.S. Pat. No. 5,255,879, issued Oct. 26, 1993, entitled "Three Axes Stabilized Spacecraft and Method of Sun Acquisition", and assigned to the assignee of the present invention. Methods, however, that use sun sensor assemblies for power acquisition can require expensive electronic hardware, such as buffer channel hardware, and can require precise maneuvering to maintain a perfect slew along a spacecraft axis that is not very close to one of the principal axes. In a spacecraft configuration with solar wing or wings deployed where accurate spacecraft body-to-sun attitude knowledge is not needed, but rather it is only needed to keep the spacecraft power safe and thermally safe, a simple and robust algorithm for power safety, which, for example, avoids the difficulties just described with sun sensor buffers and precise maneuvering, would be preferable.

For increased dependability and safety, modern spacecraft may rely on more than one spacecraft control processor (SCP) to control the functions and attitude of the spacecraft. A situation where the spacecraft switches control from one SCP to another is referred to as "toggle". An example toggle situation occurs when a first spacecraft control processor, SCP1 and its connected sensors, is in active control of the spacecraft and a second spacecraft control processor, SCP2 and its connected sensors, is in standby, i.e., is powered off. SCP1 encounters some problems detected by a monitor and decides to turn off SCP1 and turn on SCP2. SCP2 then takes over control of the spacecraft.

With the advent of high power-dissipation payloads in spacecraft, comes a large radiator to maintain payload temperature below the high operating limit. There are various situations in the operation of the spacecraft when power to the spacecraft payload may be turned off. After a situation where the spacecraft toggles from one spacecraft control processor to another, power to the spacecraft payload may be turned off. In post-toggle, i.e., after a toggle has occurred, with the spacecraft in payload-off configuration, the radiator continues to dissipate a large amount of power and, thus, requires more power for the heater to maintain the spacecraft above survival temperature compared to spacecraft with lower power-dissipation payloads. If the payload remains on, the spacecraft needs even more power to survive and the situation is worse than payload off. A power acquisition algorithm, referred to as safe-hold algorithm, may be used post-toggle to ensure that the spacecraft achieves power, thermal, and momentum safety. Due, for example, to the increased post-toggle power requirements for the heater with high power-dissipation payloads, the previously used safe-hold algorithm is no longer adequate to ensure power, thermal, and momentum safety of the spacecraft under all conditions or scenarios.

For example, a previously used safe-hold algorithm for post-toggle safety rotates the spacecraft body along an axis in the xz plane (perpendicular to the wing axis) and places the solar wing in sun searching mode. In the worst case, referred to as "paddle wheel scenario" (or cases close to this scenario), the received wing power is a sinusoidal curve with theoretical average wing power of $2/\pi$, which is approximately 64%. The paddle wheel scenario occurs when the sun line and the spacecraft spin axis are orthogonal to each other, resulting in the sun being in the "keyhole", i.e., sun in wing axis or the body y-axis, twice per revolution. Due to bus shadowing effect and the fact that the wing will take more than 360 seconds to rotate 180 degrees to search for the sun every time the sun passes the keyhole position, the received wing power is lower than the theoretical value. The useful wing power is further limited by the battery charge rate so that some of the power is discarded because the battery cannot accept all received power for charging. Because the spacecraft requires power higher than this useful wing power for safety, the previously used safe-hold algorithm no longer renders power, thermal, and momentum safety for the spacecraft.

Figure 1:
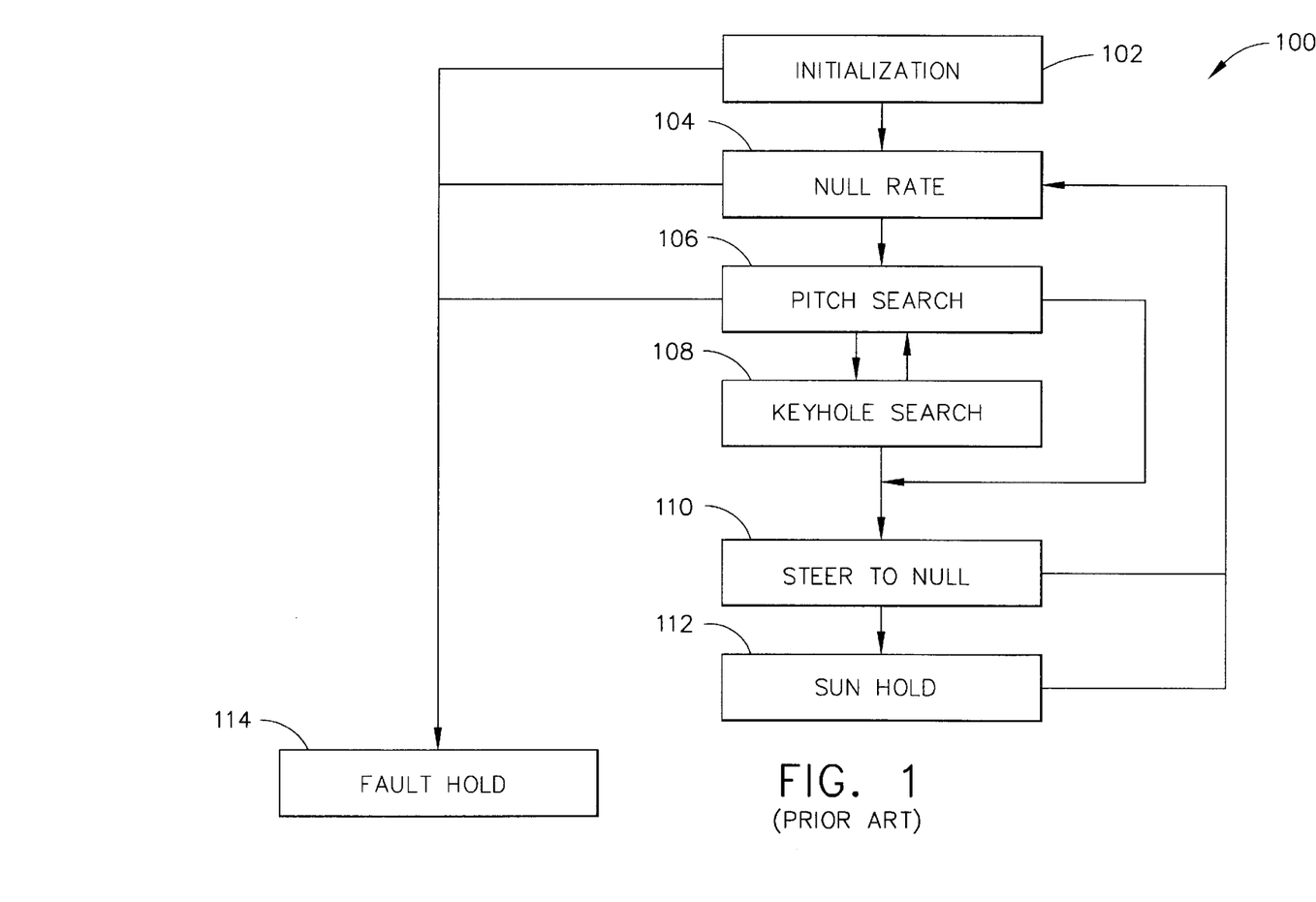
FIG. 1 is a phase transition block diagram of a previously used power acquisition procedure for spacecraft.

FIG. 1 shows a phase transition block diagram of a previously used power acquisition algorithm. Algorithm 100, shown in FIG. 1, uses wide field of view (WFOV) sun sensor assembly (SSA), and is applicable to both wing stowed or wing deployed spacecraft configuration. Algorithm 100 includes an initialization phase 102, null rate phase 104, pitch search phase 106, keyhole search phase 108, steer to null phase 110, sun hold phase 112, and fault hold phase 114. The arrows shown in FIG. 1 indicate the control logic, or flow of control, between phases of algorithm 100. For example, from initialization phase 102 control may pass either to null rate phase 104 under a "normal" state of affairs, or to fault hold phase 114 under abnormal conditions, such as algorithm 100 "timing out" before power acquisition has been achieved. As seen in FIG. 1, pitch search phase 106 may be followed by keyhole search phase 108 or may proceed directly to steer to null phase 110. As described above, algorithm 100 may leave the spacecraft in the paddle wheel scenario where useful wing power is inadequate to place the spacecraft in power, thermal, and momentum safety. Thus, algorithm 100 represents a complicated algorithm for power acquisition, which is not very robust, i.e., is prone to failure, or entering the fault hold phase 118 state, under many conditions.

As can be seen, there is a need for a simple, robust algorithm for power acquisition for power, thermal, and momentum safety for high heater-power spacecraft, and especially for post-toggle power, thermal, and momentum safety for spacecraft with high heater-power demand in payload-off configuration. There is also a need for an algorithm for spacecraft power acquisition for power, thermal, and momentum safety that can rely on direct power measurement from the solar wings rather than the indirect power measurement provided by the use of sun sensor assemblies such as WFOV sun sensors.

SUMMARY OF THE INVENTION

The present invention provides a simple, robust algorithm for power acquisition for power, thermal, and momentum safety for high heater-power spacecraft, and especially for post-toggle power, thermal, and momentum safety for spacecraft with high heater-power demand in payload-off configuration. The present invention also provides an algorithm for spacecraft power acquisition for power, thermal, and momentum safety that can rely on direct power measurement from the solar wings rather than the indirect power measurement provided by the use of sun sensor assemblies such as WFOV sun sensors.

In one aspect of the present invention, an algorithm for a spacecraft includes a wing sun search phase, an xz slew phase, and a safe hold phase. In the wing sun search phase, a solar wing current is monitored against a low current threshold while a solar wing sun search is performed, the xz slew phase is entered when the solar wing current stays below the low current threshold until a solar wing current persistence timer expires, and the safe hold phase is entered when the solar wing current does not stay below the low current threshold until the solar wing current persistence timer expires. In the xz slew phase, the spacecraft is slewed about an axis close to the xz plane while the solar wing current is continuously monitored against a high current threshold, a high current persistence timer is reset when the solar wing current is below the high current threshold, and the spacecraft is stopped slewing and the safe hold phase is entered when the solar wing current stays above the high current threshold until the high current persistence timer expires. In the safe hold phase, the spacecraft is slewed about an axis close to a y axis while the solar wing current is continuously monitored against the low current threshold, a low current persistence timer is reset when the solar wing current is above the low current threshold, and the spacecraft is stopped stewing and the xz slew phase is entered when the solar wing current stays below the low current threshold until the low current persistence timer expires.

In another aspect of the present invention, a method for spacecraft power acquisition includes performing steps included in each of a null rate phase, a wing sun search phase, an xz slew phase, and a safe hold phase. The null rate phase includes steps of starting a null rate persistence timer and a phase timer; resetting the null rate persistence timer if the spacecraft body rate differs from a null rate target by a threshold; commanding transition to a wing sun search phase when a difference of the spacecraft body rate and the null rate target stays below the threshold until the null rate persistence timer expires; and commanding transition to the wing sun search phase when the phase timer expires. The wing sun search phase includes steps of monitoring a solar wing current against a low current threshold while a solar wing sun search is performed; beginning to perform an xz slew phase when the solar wing current stays below the low current threshold until a solar wing current persistence timer expires; and beginning to perform a safe hold phase when the solar wing current does not stay below the low current threshold until the solar wing current persistence timer expires. The xz slew phase includes steps of slewing the spacecraft about an axis close to the xz plane of the spacecraft while continuously monitoring the solar wing current against a high current threshold; resetting a high current persistence timer when the solar wing current is below the high current threshold; and nulling slewing of the spacecraft and beginning to perform the safe hold phase when the solar wing current stays above the high current threshold until the high current persistence timer expires. The safe hold phase includes steps of slewing the spacecraft about an axis close to a y axis while continuously monitoring the solar wing current against the low current threshold; resetting a low current persistence timer when the solar wing current is above the low current threshold; and nulling slewing of the spacecraft and beginning to perform the xz slew phase when the solar wing current stays below the low current threshold until the low current persistence timer expires.

In still another aspect of the present invention, an algorithm for a spacecraft includes a null rate phase, a wing sun search phase, an xz slew phase, and a safe hold phase. In the null rate phase, a null rate persistence timer and a phase timer are started, the null rate persistence timer is reset if the spacecraft body rate differs from a null rate target by a threshold, transition to wing sun search phase is commanded when a difference of the spacecraft body rate and the null rate target stays below the threshold until the null rate persistence timer expires, and transition to wing sun search phase is commanded when the phase timer expires.

In the wing sun search phase, a wing sun search phase timer is started, a solar wing current is monitored against a low current threshold while a solar wing sun search is performed, the xz slew phase is entered when the solar wing current stays below the low current threshold until a solar wing current persistence timer expires, the safe hold phase is entered when the solar wing current does not stay below the low current threshold until the solar wing current persistence timer expires, and the safe hold phase is entered when the wing sun search phase timer expires after resetting the solar wing current persistence timer once.

In the xz slew phase, the spacecraft is slewed about an axis close to the xz plane while the solar wing current is continuously monitored against a high current threshold, a high current persistence timer is reset when the solar wing current is below the high current threshold, and the spacecraft is stopped slewing and the safe hold phase is entered when the solar wing current stays above the high current threshold until the high current persistence timer expires.

In the safe hold phase, the spacecraft is slewed about an axis close to a y axis while the solar wing current is continuously monitored against the low current threshold, a low current persistence timer, which is longer than the high current persistence timer, is reset when the solar wing current is above the low current threshold, and the spacecraft is stopped slewing and the xz slew phase is entered when the solar wing current stays below the low current threshold until the low current persistence timer expires.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a simple, robust algorithm for power acquisition for power, thermal, and momentum safety for high heater-power spacecraft, and especially for post-toggle power, thermal, and momentum safety for spacecraft with high heater-power demand in payload-off configuration. By providing an algorithm for spacecraft power acquisition that can rely on direct power measurement from the solar wings, the present invention renders power, thermal, and momentum safety for high heater-power spacecraft where previously used algorithms are no longer power safe in all scenarios, particularly in the paddle wheel scenario referred to above and described in more detail below.

In one embodiment, the invention uses solar wing current sensors, which provide a direct power measurement, instead of wide field of view (WFOV) sun sensors, which provide only indirect power measurement, in a simple and robust algorithm to ensure power, thermal, and momentum safety in safe-hold mode. The algorithm eliminates WFOV sun sensor assemblies and their associated spacecraft control processor (SCP) electronic hardware and SCP processing software, thus reducing cost over the prior art. The invention does not need to use sun sensor assemblies at all; it may use wing current to determine sun angle relative to the wing; it may use gyro, for example, a hemispherical inertial reference unit (HIRU), to determine spacecraft body rate and position, or it may use a star tracker to determine spacecraft body rate and position. The inventive algorithm checks the solar wing current to be above the heater required current threshold and autonomously guarantees indefinite power, thermal, and momentum safety. The inventive algorithm may use filtering or a voting scheme with multiple wing current sensors to determine solar wing current. Thus, the invention increases the spacecraft safe-hold duration from a few hours to almost indefinite duration, allowing more options and time, compared to the prior art, for ground intervention for back-to-service recovery while the spacecraft remains in a safe state.

Figure 2A:
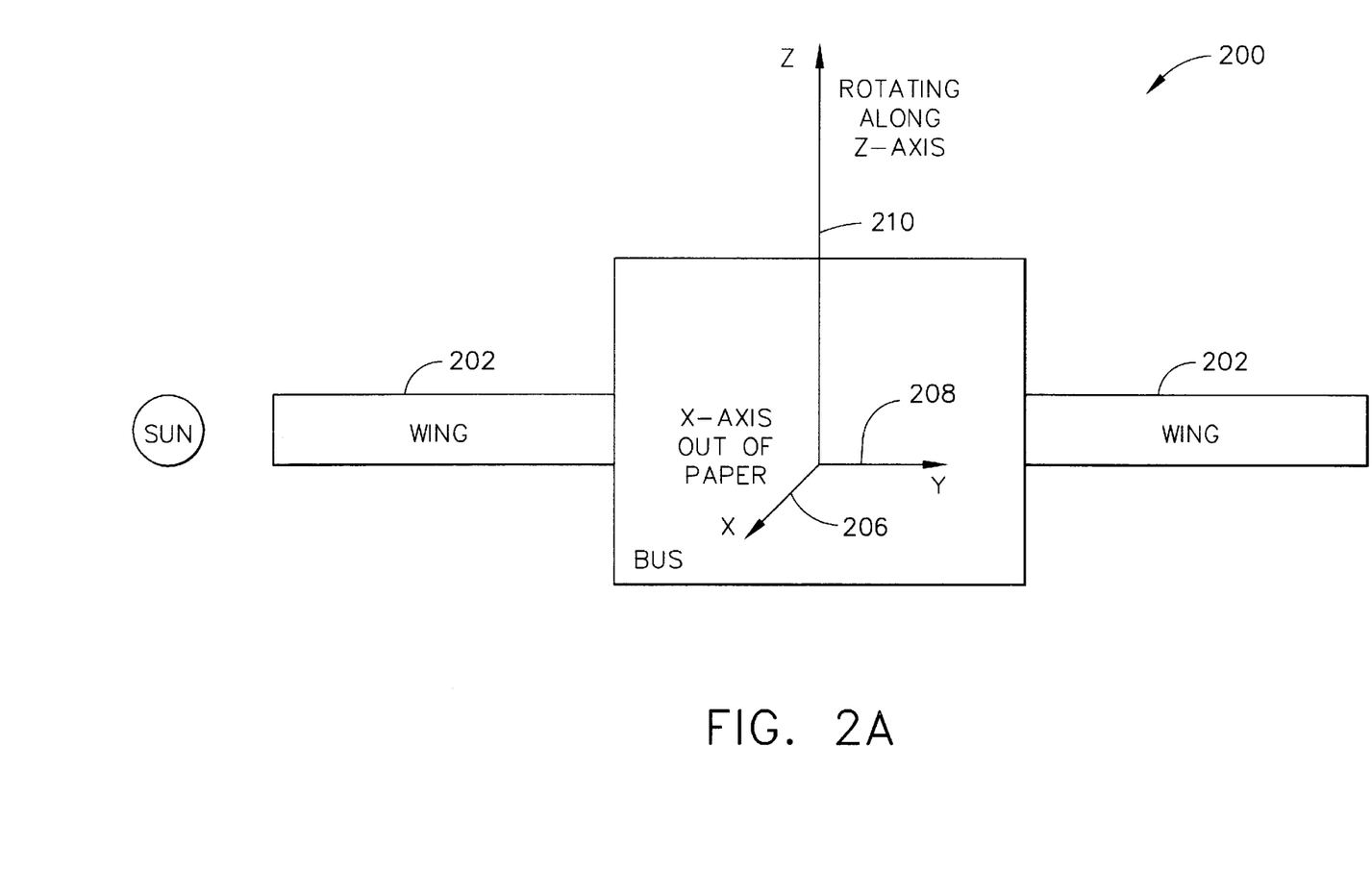
FIG. 2A is a schematic view of a spacecraft with solar panel "wings" deployed and using current sensors for power acquisition, according to an embodiment of the present invention.
Figure 2B:
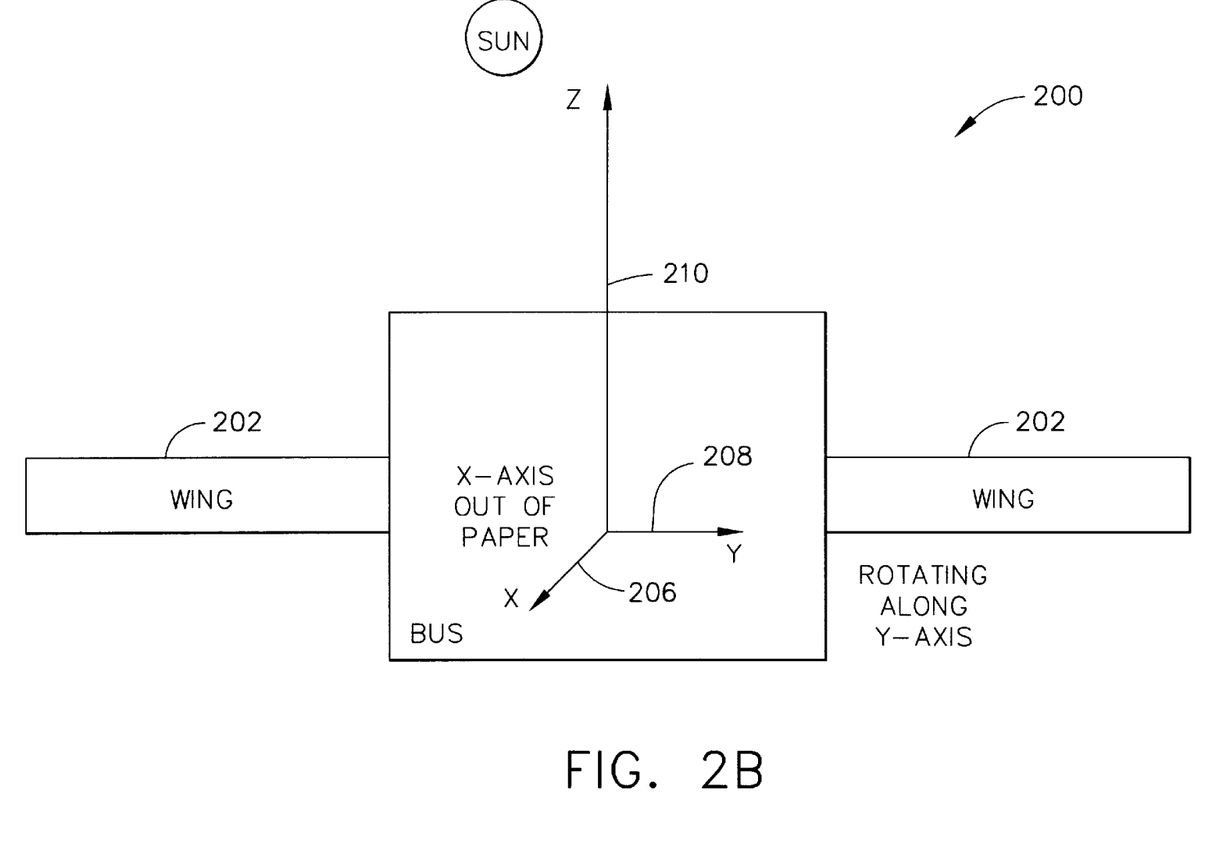
FIG. 2B is a schematic view of a spacecraft with solar panel "wings" deployed and using current sensors for power acquisition, according to an embodiment of the present invention.

Referring now to FIGS. 2A and 2B, spacecraft 200, using the inventive algorithm for power acquisition, is illustrated according to an embodiment of the present invention. Spacecraft 200 may include solar panel wings 202. FIGS. 2A and 2B also show a 3-dimensional x-y-z reference frame, also referred to as "body" reference frame, comprising three mutually perpendicular axes, x axis 206, y axis 208, and z axis 210. Each wing 202 has a centerline or wing axis, which may be parallel or collinear with y-axis 208. Rotation of spacecraft 200 about x-axis 206 may be referred to as "roll", "spin", or "x-spin". Rotation of spacecraft 200 about y-axis 208 may be referred to as "pitch", and y-axis 208 may be referred to as the "pitch axis". Rotation of spacecraft 200 about z-axis 210 may be referred to as "yaw" or "z-spin", and z-axis 210 may be referred to as the "yaw axis". The plane containing x-axis 206 and y-axis 208 is referred to as the "xy plane"; the plane containing y-axis 208 and z-axis 210 is referred to as the "yz plane"; and, the plane containing x-axis 206 and z-axis 210 is referred to as the "xz plane". An axis about which spacecraft 200 is rotating, or spinning, may be referred to as the "spin axis"; for example, if spacecraft 200 is undergoing x-spin, then x-axis 206 may be referred to as the spin axis. "Polar angle" refers to an angle, in any plane containing the spin axis and the sun line, measured with respect to the spin axis. The sun line is the direction vector from the spacecraft center to the sun.

FIG. 2A shows spacecraft 200 in the "paddle wheel" scenario, in which spacecraft 200 is rotating, or spinning, about the z-axis 210. The paddle wheel scenario is the worst case scenario for power reception from the sun by solar wings 202, and is characterized by the spin axis of spacecraft 200, in the xz plane, being perpendicular, also referred to as orthogonal or normal, to the sun line. As illustrated by the example paddle wheel scenario shown in FIG. 2A, the spin axis of spacecraft 200 may be z axis 210, which is perpendicular to the sun line from spacecraft 200 to the sun in FIG. 2A. Thus, solar wings 200 resemble paddles of a paddle wheel, paddling through the sun, twice for each revolution of spacecraft 200 about z-axis 210. When the sun is approximately aligned with the wing axis of wings 202 (y axis 208), as seen in FIG. 2A, the sun is referred to as being in "keyhole", and a keyhole scenario is one in which the spacecraft 200 rotation leaves the sun approximately in keyhole.

FIG. 2B shows spacecraft 200 in power safe configuration, in which spacecraft 200 is spinning about y axis 208: In power safe configuration, power reception from the sun by solar wings 202 is adequate to ensure power, thermal, and momentum safety for spacecraft 200. Power safe configuration may be characterized by the wing axis of wings 202 being near perpendicular to the sun line. As illustrated by the example shown in FIG. 2B, the spin axis of spacecraft 200 is y axis 208, which is also the wing axis of wings 202, and is perpendicular to the sun line from spacecraft 200 to the sun in FIG. 2B. Thus, as seen in FIG. 2B, in power safe configuration the sun may be close to the xz plane; the sun line may be near perpendicular to the wing axis, i.e., y axis 208; and the sun polar angle, between the sun and y axis 208, i.e., the spin axis, may be close to 90 degrees during revolutions of spacecraft 200.

The fundamental geometry observation relevant to the present invention is that by rotating spacecraft 200 about an axis in or close to the xz plane, i.e., an axis nearly perpendicular to the wing axis (y axis 208), one can rotate spacecraft 200 such that the sun is in or close to the xz plane. The sun line, therefore, is nearly perpendicular to the wing axis of rotation (y-axis 208), and wing 202 will receive high sun power.

In one embodiment, the algorithm of the present invention renders spacecraft power, thermal, and momentum safety using the following procedure:

1) Rotate spacecraft 200 body along an axis in (or close to) the xz plane, referred to as "xz slew", and place solar wings 202 in sun searching;

2) When wing current exceeds the power-safe threshold by a certain margin, stop the spacecraft 200 xz slew to lock on to the desired high power and to avoid slewing into any keyhole or paddle wheel scenario;

3) Slew spacecraft 200 in (or close to) the wing axis (body y axis 208) to maintain the desired sun polar angle for high power, and to average out the momentum and thermal conditions. This is a power, thermal, and momentum safe state for long duration until ground intervention for back-to-service recovery;

4) If, for any reason, the power has fallen below the power-safe threshold, spacecraft 200 will autonomously go back to step 1 above to search for high power and eventually lock on to the desired high power again.

Figure 3:
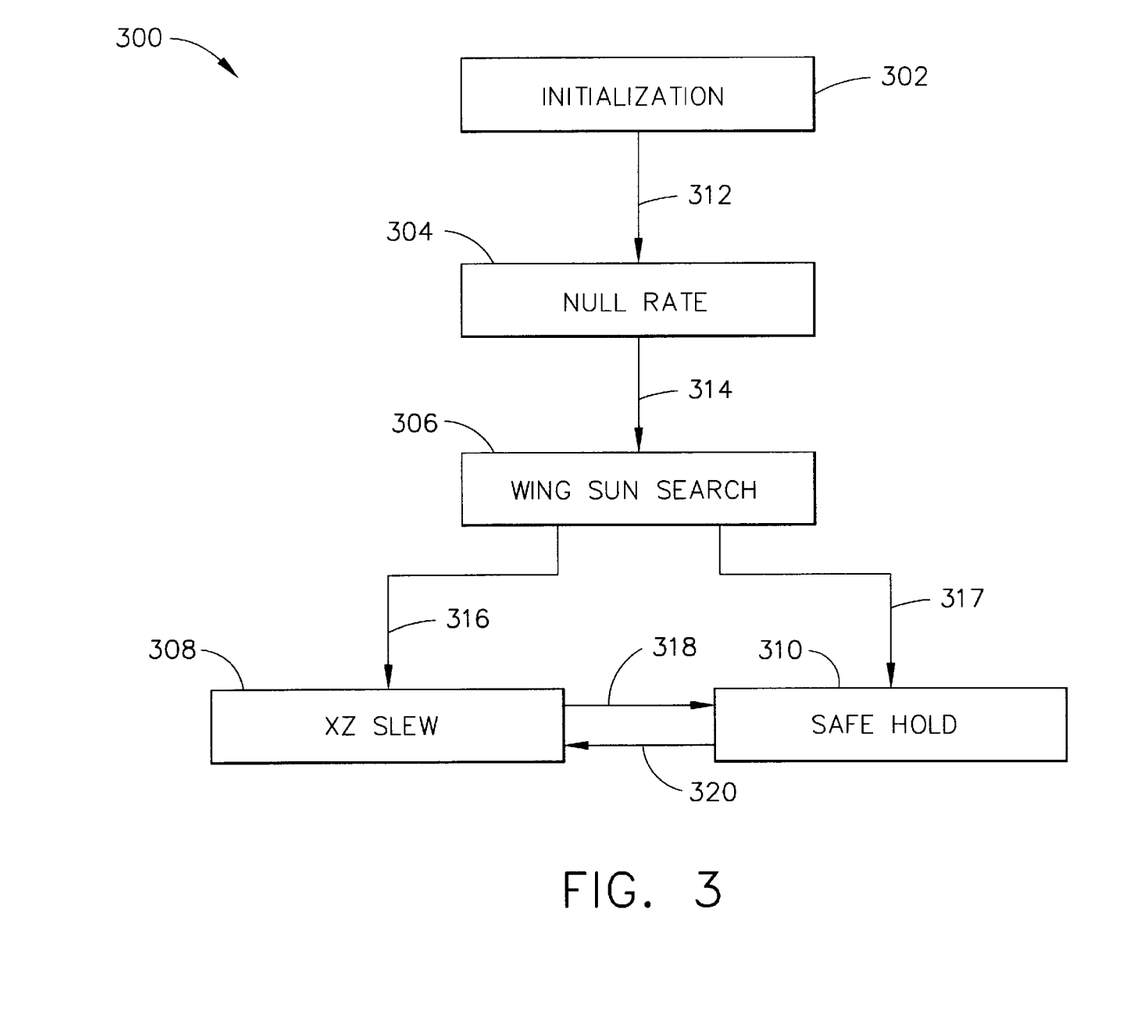
FIG. 3 is a phase transition block diagram of an algorithm according to an embodiment of the present invention, for power acquisition using current sensors with spacecraft "wings" deployed.

Referring now to FIG. 3, a phase transition block diagram is used to illustrate algorithm 300 according to one embodiment. The initial state of the spacecraft prior to execution of algorithm 300, for example, is that the spacecraft may be in arbitrary attitude and momentum states under wing-deployed configuration. It may be that only one wing is deployed, or multiple wings may be deployed. The final state of the spacecraft after execution of algorithm 300, for example, is that the spacecraft may be in power safe configuration, such as illustrated in FIG. 2B. For purposes of illustration of algorithm 300 reference is made to spacecraft 200, shown in FIGS. 2A and 2B.

Algorithm 300 may include initialization phase 302, null rate phase 304, wing sun search phase 306, xz slew phase 308, and safe hold phase 310. The essential operation, however, of algorithm 300 may be embodied in xz slew phase 308, and safe hold phase 310. Arrows 312, 314, 316, 317, 318, and 320 shown in FIG. 3 indicate the control logic, or flow of control, between phases of algorithm 300.

Algorithm 300 may begin processing with initialization phase 302. Initialization phase 302 may perform all necessary actuator and software configurations, including:

1) Set both solar wing drives (SWD) to ground stepping mode;
2) Set Wheel_Mode (i) to Acceleration, for i=1:4;
3) Select Attitude Hold table in the case of thruster control;
4) Set steering to inertial.

Setting both solar wing drives to ground stepping mode allows actuators to null the spacecraft body rate more gracefully during null rate phase 304. For example, algorithm 300 may also be used in the context of an Init-to-Normal mode program, a spacecraft bus configuration program that is executed when an SCP is powered on, toggled on, or reset. Init-to-Normal may enable an A4 Reaction Wheel Fault Protection Response before calling algorithm 300. It is important to realize that A4 Reaction Wheel Fault Protection Response does not take effect until Wheel_Mode is set to Acceleration. Therefore, post-toggle of SCP, A4 Reaction Wheel Fault Protection Response really does not start responding to wheel failure until algorithm 300 is entered. Inertial steering is the standard choice before 3-axis attitude is acquired.

Algorithm 300 has two null rates options that will allow the use of wheels or thrusters during the null rate phase 304. The programmable read-only memory (PROM) default null rates option is the wheel actuation option that is used in all autonomous evocations of algorithm 300. The thruster option can be selected by ground to dump wheel momentum during null rate phase 304 (as further described below). If the thruster option is selected, exit processing of initialization phase 302 checks HIRU_Data validity and commands the phase transition to null rate phase 304 when HIRU_Data is valid, as indicated by arrow 312 in FIG. 3. For wheel option, transition to null rate phase 304 is unconditional, as indicated by arrow 312 in FIG. 3.

Algorithm 300 may continue processing with null rate phase 304. Null rate phase 304 of algorithm 300 provides the system momentum assessment and that information may be used to decide the xz slew direction in xz slew phase 308 and the pitch-slew direction in safe hold phase 310 in order to maximize the wheel momentum margins.

On entry to null rate phase 304, a commanded body rate specified by the null rate target may be sent to bus steering (STR) computer software unit (CSU). For thruster null rate option, algorithm 300 may offer an autonomous momentum dump capability. The wheel momentum dump target is specified by H_Wheels (default to a zero vector). A Boolean flag that controls the application of a momentum dump feature, SHM_Momentus_Set, can be commanded externally to algorithm 300. When SHM_Momentum_Set is set to true, a wheel momentum command given by H_Wheels is sent to reaction wheel steering (RWS) computer software unit.

Null rate phase 304 uses a phase timer to define a maximum amount of time that can be spent in null rate phase 304. The phase timer is default to 600 seconds (T_rate_null). A null rate persistence timer is used to verify the null rate performance and this timer is default to 100 seconds (T_threshold). In null rate phase 304 processing, if HIRU_Data is valid and body rate differs from the null rate target (defaults to orbital rate) by a threshold, the null rate persistence timer is reset to its default. Whenever HIRU_Data is invalid, the null rate persistence timer is also reset to its default.

If the difference of the body rate and the null rate target stays below the threshold persistently for T_threshold seconds, transition to wing sun search phase 306 is commanded, as indicated by arrow 314 in FIG. 3. If the null rate persistence timer never expires, transition to wing sun search phase 306 is commanded upon expiration of the phase timer, as indicated by arrow 314 in FIG. 3. On exit from null rate phase 304, both solar wing drives are set to sun search mode and SOL_Gain_Index is set to High, which allows solar wing sun search to reach a steady search rate of approximately 0.61 degrees/second. If the thruster option is selected, reaction control system (RCS) will be disabled and RCS latch valves will be closed as well on exit from null rate phase 304. On exit from null rate phase 304, control may pass to wing sun search phase 306, as indicated by arrow 314 in FIG. 3.

Algorithm 300 may continue processing with wing sun search phase 306. Upon entry to wing sun search phase 306, both the phase timer and solar wing current persistence timer are initialized to 660 seconds (T_SS_max+T_I_max, T_SS_max=600 seconds and T_I_max=60 seconds).

In sun search phase 306 processing, after 600 seconds has expired, i.e., solar wings 202 have had a chance to search for 300 degrees, the solar wing current persistence timer may be reinitialized to 20 seconds (δT_I_SS) once. Then, solar wing currents are monitored against a Low_Current_Threshold. If either wing current stays above the low current threshold, the solar wing current persistence timer gets reset to δT_I_SS. The actual current thresholds are in solar wing steering (SOL) CSU and Low_Current_Threshold may default, for example, to approximately 52.9 Amperes (A) for a 4-panel wing and 71.0 A for a 5-panel wing. The sizing of the low current thresholds may depend on the power requirements of spacecraft 200, in particular, the heater load requirements, and may include a safety margin. Low current thresholds are more fully described below in connection with high current thresholds.

If both solar wing currents stay below the low threshold (Wing_i_Above_Low_Th=false, i=1:2) persistently for δT_I_SS seconds, indicating pitch axis (y axis 208) is too close to the sun line, the solar wing current persistence timer will expire and transition to xz slew phase 308 may be commanded, as indicated by arrow 316 in FIG. 3. If the phase timer has expired without detecting persistent low currents on both wings, transition to safe hold phase 310 may be commanded, as indicated by arrow 317 in FIG. 3.

Solar wing sun search needs to cover 300 degrees of sky for the worst-case geometry when the sun is within the tiny gap between the concentrators of north and south wings 202 and wings 202 happen to start wing sun search in the directions that they will be rotating away from the sun. With SOL_Gain_Index=High, solar wing 202 can reach a steady rate, for example, of 0.61 degrees/second. At such a rate, a 300-degree search requires a minimum of 500 seconds. T_SS_max default is 600 seconds to offer a conservative search overlap and to compensate for solar wing rates ramp-up. The additional 60 seconds (T_I_max) in the phase timer is to allow some time to verify solar wing current persistence against the low threshold so that the phase transition path can be selected. Therefore, T_I_max shall always be greater than δT_I_SS, should ground decide to reprogram these default parameters.

Algorithm 300 includes xz slew phase 308. The combined motion of body and solar wing sun search offered by xz slew phase 308 is used as a vehicle for solar wing sun acquisition. Once it is decided it is necessary to search for sun, i.e., pitch axis (y axis 208) is too far from sun-normal plane, i.e., the plane perpendicular to the sun line, xz slew phase 308 is activated and guarantees to place the sun close enough to the spacecraft 200 xz plane.

Upon entry to xz slew phase 308, an xz-slew rate, $\omega_{xz}$, which may be a gyro or star tracker derived rate for slewing the spacecraft, is commanded to the bus steering, i.e., STR, CSU. The default $\omega_{xz}$ may be, for example, 0.05 degrees/second. The slew axis is determined based on wheel availability. Once the slew axis is determined, the slew direction along the slew axis is chosen based on the wheel momentum projection onto the slew axis. Such a design allows wheel momentum to be used partially to generate the commanded slew. Then, a current persistence timer of 20 seconds (δT_I_high) is started and SOL_Gain_Index is set to High.

In xz slew phase 308 processing, solar wing currents may be continuously monitored against a High_Current_Threshold. The actual current thresholds are in the solar wing control (SOL) CSU and High_Current_Threshold may default, for example, to approximately 58.2 A for a 4-panel wing and 78.1 A for a 5-panel wing. Wing_i_Above_Low_Th and Wing_i_Above_High_Th are interfaces from the SOL CSU to provide the status if solar currents are above low threshold and high threshold for i=north and south wings 202. If both wing currents are below the high current threshold, the current persistence timer gets reset to δT_I_high.

If any wing current stays above the high threshold for 6T_I_high seconds, the current persistence timer will expire. Then, a null rate command may be sent to the STR CSU and a phase timer and a null rate persistence timer may be started. The defaults for phase timer and null rate persistence timer may be, for example, 600 seconds (T_stop_XZ_max) and 100 seconds (T_stop_XZ), respectively. The null rate persistence time is reset to T_stop_XZ if body rate is not nulled below a threshold. The idea is to allow some time to null the xz slew rate but limit the maximum amount of time that can be spent to null the rates. The design is somewhat like imbedding a miniature null rate phase 304 within xz slew phase 308 processing.

If the null rate persistence timer has expired, transition to safe hold phase 310 is commanded, as indicated by arrow 318 in FIG. 3. Otherwise, safe hold phase 310 is commanded upon expiration of the phase timer, as indicated by arrow 318 in FIG. 3.

Algorithm 300 includes safe hold phase 310. Safe hold phase 310 is the power safe attitude hold phase, and safe hold phase 310 is entered when a solar wing current is assessed to be above a threshold. It is useful to realize that the software structure of safe hold phase 310 may be identical to that of xz slew phase 308, only the parameters used are different. When entering safe hold phase 310, a body rotation around (or close to) the pitch axis (y axis 208) is commanded, referred to as y slew phase, to avoid the possibility of staying in a telemetry and command (T&C) blind spot for an extended period of time.

Upon entry to y slew phase, a y slew rate, $\omega_Y$, which may be a gyro or star tracker derived rate for slewing the spacecraft, is commanded to STR CSU. The default $\omega_Y$ may be, for example, 0.1 degree/second. A current persistence timer of 120 seconds (δT_I_low) is started and SOL_Gain_Index is set to Low. Setting SOL_Gain_Index to low selects a lower wing sun search rate, for example, of 0.3 degree/second in SOL CSU. Similar to xz slew phase 308, the slew direction along the slew axis is chosen based on the wheel momentum projection onto the slew axis so that the wheel momentum can be partially utilized to generate the commanded slew.

In safe hold phase 310 processing, solar wing currents may be continuously monitored against a Low_Current_Threshold. If any wing current is above the low current threshold, the current persistence timer gets reset to δT_I_low. If both wing currents stay below the low current threshold for δT_I_low seconds, the current persistence timer will expire. Then, a null rate command may be sent to the STR CSU and a phase timer and a null rate persistence timer may be started. The phase timer may default, for example, to 200 seconds (T_stop_Y_max), and the null rate persistence timer may default, for example, to 50 seconds (T_stop_Y). The null rate persistence timer is reset to T_stop_Y if body rate is not nulled below a threshold. The idea is to allow some time to null the y slew rate but limit the maximum amount of time that can be spent to null the rate. The design is somewhat like imbedding a miniature null rate phase 304 within safe hold phase 310 processing.

If the null rate persistence timer has expired, transition to xz slew phase 308 is commanded, as indicated by arrow 320 in FIG. 3. Otherwise, xz slew phase 308 is commanded upon expiration of the phase timer, as indicated by arrow 320 in FIG. 3.

The use of a longer current persistence timer (δT_I_low=120 seconds) compared with (δT_I_high=20 seconds) reflects the bias toward the transition to safe hold phase 310 over xz slew phase 308. Safe hold phase 310 represents the best attitude that can be achieved by algorithm 300; Safe hold phase 310 offers an attitude from which spacecraft 200 can generate the power required to maintain bus and payload above the survival temperature and offers a quasi-inertially fixed spin axis in space, assuming no unit failures. Transition to xz slew phase 308 reflects an assessment of power unsafe attitude and a more-or less dramatic slew maneuver is required to correct the attitude. A longer current persistence for transition to xz slew phase 308 reflects the effort to make sure this assessment is a sound one that the software can make in real-time.

The high and low current thresholds that dictate the phase transitions to xz slew phase 308 and safe hold phase 310 in algorithm 300 may be in the SOL CSU. The high and low current thresholds are used to generate Wing_i_Above_High and Wing_i_Above_Low status for i=north and south wings 202. Post-toggle, for example, a heater load of 2700 Watts (W) and a bus load of 380 W may be supported. Given a bus voltage, for example, of 100 Volts (V), a lower bound for the low current threshold of 35A may be required to offer a little power margin. The high current threshold may sized to a value, for example, that is 1.1 A less than the end of life equinox current of approximately 59.3 A for a 4-panel wing to accommodate all solar cell population configurations of the most inner solar panel, including the null population configuration. The high current threshold has to be lower than the end of life equinox solar current for spacecraft 200 to have a chance to cross the high current threshold at the end of life during xz slew. The low current threshold may be sized, for example, to the end of life solstice current of 52.9A to avoid unnecessary transition to xz slew phase 308 should an SCP toggle occur during a solstice season at end of life. The low and high current thresholds for 5-panel wings are designed using the same approach and their defaults may be, for example, 71.0 A and 78.1 A, respectively. The difference between the high and low thresholds for 4-panel wings may be, for example, 5.3 A and, for 5-panel wings, 7.1 A. These spreads between high and low thresholds offer a large enough window to suppress the solar wing sun locking-induced solar wing current oscillation and, hence, limit the cycling frequency between xz slew phase 308 and safe hold phase 310.

Two solar wing sun search rates are used in algorithm 300. These rates may be in the SOL CSU. Either of the two rates may be selected by setting SOL_Gain_Index to high or low. The higher wing search rate may be, for example, 0.61 degrees/second and it may be used in wing sun search phase 306 and xz slew phase 308 to minimize the timeline to achieve power safety. The lower wing search rate may be, for example, 0.3 degrees/second and it may be used in safe hold phase 310 to minimize the dithering when solar wings 202 are locked onto the sun.

It should be understood, of course, that the foregoing relates to preferred embodiments of the invention and that modifications may be made without departing from the spirit and scope of the invention as set forth in the following claims.

We claim:

1. An algorithm for a spacecraft, comprising:
   an xz slew phase, and a safe hold phase wherein:
   in said xz slew phase, the spacecraft is slewed about an axis close to the xz plane while a solar wing current is continuously monitored against a high current threshold, a high current persistence timer is reset when said solar wing current is below said high current threshold, and the spacecraft is stopped slewing and said safe hold phase is entered when said solar wing current stays above said high current threshold until said high current persistence timer expires; and
   in said safe hold phase, the spacecraft is slewed about an axis close to a y axis while said solar wing current is continuously monitored against a low current threshold, a low current persistence timer is reset when said solar wing current is above said low current threshold, and the spacecraft is stopped slewing and said xz slew phase is entered when said solar wing current stays below said low current threshold until said low current persistence timer expires.

2. The algorithm of claim 1, further comprising a wing sun search phase wherein, in said wing sun search phase, said solar wing current is monitored against said low current threshold while a solar wing sun search is performed, said xz slew phase is entered when said solar wing current stays below said low current threshold until a solar wing current persistence timer expires, and said safe hold phase is entered when said solar wing current does not stay below said low current threshold until said solar wing current persistence timer expires.

3. The algorithm of claim 1 wherein, in said wing sun search phase, said safe hold phase is entered when a phase timer expires after resetting said solar wing current persistence timer once.

4. The algorithm of claim 1 wherein, said low current persistence timer is longer than said high current persistence timer.

5. The algorithm of claim 1 wherein said low current persistence timer expires after approximately 120 seconds.

6. The algorithm of claim 1 wherein said high current persistence timer expires after approximately 20 seconds.

7. The algorithm of claim 1 wherein, in said xz slew phase, before the spacecraft is stopped slewing, a null rate persistence timer and a phase timer are started, said null rate persistence timer is reset if the spacecraft body rate is not nulled below a threshold, transition to safe hold phase is commanded when said null rate persistence timer expires, and transition to safe hold phase is commanded when said phase timer expires.

8. The algorithm of claim 1 wherein, in said safe hold phase, before the spacecraft is stopped slewing, a null rate persistence timer and a phase timer are started, said null rate persistence timer is reset if the spacecraft body rate is not nulled below a threshold, transition to xz slew phase is commanded when said null rate persistence timer expires, and transition to xz slew phase is commanded when said phase timer expires.

9. The algorithm of claim 1, further comprising a null rate phase wherein a null rate persistence timer and a phase timer are started, said null rate persistence timer is reset if the spacecraft body rate differs from a null rate target by a threshold, transition to wing sun search phase is commanded when a difference of the spacecraft body rate and said null rate target stays below said threshold until said null rate persistence timer expires, and transition to wing sun search phase is commanded when said phase timer expires.

10. The algorithm of claim 1, further comprising an initialization phase wherein said initialization phase performs actuator and software configurations necessary for power acquisition.

11. The algorithm of claim 10 wherein said initialization phase includes setting solar wing drives to a ground stepping mode, setting wheel modes to acceleration, and setting steering to inertial.

12. The algorithm of claim 1 wherein wheels are used as actuators for slewing the spacecraft.

13. The algorithm of claim 1 wherein thrusters are used as actuators for slewing the spacecraft.

14. The algorithm of claim 1 wherein a gyro derived rate is used for slewing the spacecraft.

15. The algorithm of claim 1 wherein a star tracker derived rate is used for slewing the spacecraft.

16. The algorithm of claim 1 wherein at least one wing current sensor and filtering is used to monitor said solar wing current.

17. The algorithm of claim 1 wherein at least two wing current sensors and a voting scheme is used to monitor said solar wing current.

18. A method for spacecraft power acquisition comprising steps of:
   beginning to perform an xz slew phase when a solar wing current stays below a low current threshold until a solar wing current persistence timer expires;
   beginning to perform a safe hold phase when said solar wing current does not stay below said low current threshold until said solar wing current persistence timer expires;
   performing said xz slew phase including slewing the spacecraft about an axis close to the xz plane of the spacecraft while continuously monitoring said solar wing current against a high current threshold;

resetting a high current persistence timer when said solar wing current is below said high current threshold;

nulling slewing of the spacecraft and beginning to perform said safe hold phase when said solar wing current stays above said high current threshold until said high current persistence timer expires;

performing said safe hold phase, including slewing the spacecraft about an axis close to a y axis while continuously monitoring said solar wing current against said low current threshold;

resetting a low current persistence timer when said solar wing current is above said low current threshold; and nulling slewing of the spacecraft and beginning to perform said xz slew phase when said solar wing current stays below said low current threshold until said low current persistence timer expires.

19. The method of claim 18 further including steps of:

performing a null rate phase including starting a null rate persistence timer and a phase timer;

resetting said null rate persistence timer if the spacecraft body rate differs from a null rate target by a threshold;

commanding transition to a wing sun search phase when a difference of the spacecraft body rate and said null rate target stays below said threshold until said null rate persistence timer expires;

commanding transition to said wing sun search phase when said phase timer expires; and performing said wing sun search phase including monitoring said solar wing current against said low current threshold while a solar wing sun search is performed.

20. The method of claim 19 wherein said wing sun search phase further includes a step of beginning to perform said safe hold phase when a sun search phase timer expires after resetting said solar wing current persistence timer once.

21. The method of claim 18 wherein said low current persistence timer is longer than said high current persistence timer.

22. The method of claim 18 wherein said low current persistence timer expires after approximately 120 seconds.

23. The method of claim 18 wherein said high current persistence timer expires after approximately 20 seconds.

24. The method of claim 18 further including steps of, before the step of nulling slewing of the spacecraft in said xz slew phase:

starting a null rate persistence timer and a phase timer;

resetting said null rate persistence timer if the spacecraft body rate is not nulled below a threshold;

commanding transition to safe hold phase when said null rate persistence timer expires; and commanding transition to safe hold phase when said phase timer expires.

25. The method of claim 18 further including steps of, before the step of nulling slewing of the spacecraft in said safe hold phase:

starting a null rate persistence timer and a phase timer;

resetting said null rate persistence timer if the spacecraft body rate is not nulled below a threshold;

commanding transition to xz slew phase when said null rate persistence timer expires; and commanding transition to xz slew phase when said phase timer expires.

26. The method of claim 18, further comprising an initialization phase wherein said initialization phase includes steps of performing actuator and software configurations necessary for power acquisition.

27. The method of claim 26 wherein said initialization phase includes steps of setting solar wing drives to a ground stepping mode, setting wheel modes to acceleration, and setting steering to inertial.

28. The algorithm of claim 18 wherein wheels are used as actuators for slewing the spacecraft.

29. The algorithm of claim 18 wherein thrusters are used as actuators for slewing the spacecraft.

30. The algorithm of claim 18 wherein a gyro derived rate is used for slewing the spacecraft.

31. The algorithm of claim 18 wherein a star tracker derived rate is used for slewing the spacecraft.

32. The algorithm of claim 18 wherein at least one wing current sensor and filtering is used to monitor said solar wing current.

33. The algorithm of claim 18 wherein at least two wing current sensors and a voting scheme is used to monitor said solar wing current.

34. An algorithm for a spacecraft, comprising:

a null rate phase, a wing sun search phase, an xz slew phase, and a safe hold phase wherein:

in said null rate phase, a null rate persistence timer and a phase timer are started, said null rate persistence timer is reset if the spacecraft body rate differs from a null rate target by a threshold, transition to wing sun search phase is commanded when a difference of the spacecraft body rate and said null rate target stays below said threshold until said null rate persistence timer expires, and transition to wing sun search phase is commanded when said phase timer expires;

in said wing sun search phase, a wing sun search phase timer is started, a solar wing current is monitored against a low current threshold while a solar wing sun search is performed, said xz slew phase is entered when said solar wing current stays below said low current threshold until a solar wing current persistence timer expires, said safe hold phase is entered when said solar wing current does not stay below said low current threshold until said solar wing current persistence timer expires, and said safe hold phase is entered when said wing sun search phase timer expires after resetting said solar wing current persistence timer once;

in said xz slew phase, the spacecraft is slewed about an axis close to the xz plane while said solar wing current is continuously monitored against a high current threshold, a high current persistence timer is reset when said solar wing current is below said high current threshold, and the spacecraft is stopped slewing and said safe hold phase is entered when said solar wing current stays above said high current threshold until said high current persistence timer expires;

in said safe hold phase, the spacecraft is slewed about an axis close to a y axis while said solar wing current is continuously monitored against said low current threshold, a low current persistence timer is reset when said solar wing current is above said low current threshold, and the spacecraft is stopped slewing and said xz slew phase is entered when said solar wing current stays below said low current threshold until said low current persistence timer expires; and said low current persistence timer is longer than said high current persistence timer.

35. The algorithm of claim 34 wherein said low current persistence timer expires after approximately 120 seconds.

36. The algorithm of claim 34 wherein said high current persistence timer expires after approximately 20 seconds.

37. The algorithm of claim 34 wherein, in said xz slew phase, before the spacecraft is stopped stewing, a null rate persistence timer and a phase timer are started, said null rate persistence timer is reset if the spacecraft body rate is not nulled below a threshold, transition to safe hold phase is commanded when said null rate persistence timer expires, and transition to safe hold phase is commanded when said phase timer expires.

38. The algorithm of claim 34 wherein, in said safe hold phase, before the spacecraft is stopped slewing, a null rate persistence timer and a phase timer are started, said null rate persistence timer is reset if the spacecraft body rate is not nulled below a threshold, transition to xz slew phase is commanded when said null rate persistence timer expires, and transition to xz slew phase is commanded when said phase timer expires.

39. The algorithm of claim 34, further comprising an initialization phase wherein said initialization phase performs actuator and software configurations necessary for power acquisition including setting solar wing drives to a ground stepping mode, setting wheel modes to acceleration, and setting steering to inertial.

40. The algorithm of claim 34 wherein wheels are used as actuators for stewing the spacecraft.

41. The algorithm of claim 34 wherein thrusters are used as actuators for slewing the spacecraft.

42. The algorithm of claim 34 wherein a gyro derived rate is used for slewing the spacecraft.

43. The algorithm of claim 34 wherein a star tracker derived rate is used for slewing the spacecraft.

44. The algorithm of claim 34 wherein at least one wing current sensor and filtering is used to monitor said solar wing current.

45. The algorithm of claim 34 wherein at least two wing current sensors and a voting scheme is used to monitor said solar wing current.

* * * * *